(12) United States Patent
Braudes

(10) Patent No.: US 8,914,446 B2
(45) Date of Patent: Dec. 16, 2014

(54) IM CONTINUATION ACROSS SIP SESSIONS AND ACROSS CLIENTS FOR POINT-TO-POINT AND MULTI-USER CHAT

(75) Inventor: Robert E. Braudes, Dracut, MA (US)

(73) Assignee: Avaya Inc., Basking Ridge, NJ (US)

( * ) Notice: Subject to any disclaimer, the term of this patent is extended or adjusted under 35 U.S.C. 154(b) by 214 days.

(21) Appl. No.: 13/080,540

(22) Filed: Apr. 5, 2011

(65) Prior Publication Data
US 2012/0259925 A1  Oct. 11, 2012

(51) Int. Cl.
*G06F 15/16* (2006.01)
*H04L 12/58* (2006.01)

(52) U.S. Cl.
CPC ............... *H04L 51/16* (2013.01); *H04L 51/04* (2013.01)
USPC ............ 709/206; 709/204; 709/207; 715/752

(58) Field of Classification Search
CPC .............................. H04L 51/04; H04L 51/16
USPC ............................ 709/206, 204, 207; 715/752
See application file for complete search history.

(56) References Cited

U.S. PATENT DOCUMENTS

| | | | |
|---|---|---|---|
| 7,328,242 B1* | 2/2008 | McCarthy et al. | 709/204 |
| 2007/0033250 A1* | 2/2007 | Levin et al. | 709/204 |
| 2007/0266096 A1* | 11/2007 | Daly et al. | 709/204 |
| 2009/0006548 A1* | 1/2009 | Ramanathan et al. | 709/204 |
| 2009/0006632 A1* | 1/2009 | Ramanathan et al. | 709/228 |
| 2009/0164639 A1* | 6/2009 | Sylvain | 709/227 |
| 2009/0210800 A1* | 8/2009 | McCann et al. | 715/752 |
| 2011/0302245 A1* | 12/2011 | Li | 709/204 |
| 2012/0005277 A1* | 1/2012 | O'Sullivan et al. | 709/206 |
| 2012/0259925 A1* | 10/2012 | Braudes | 709/206 |
| 2013/0005370 A1* | 1/2013 | Tysowski | 455/466 |

OTHER PUBLICATIONS

"Simple made Simple: An Overview of the I.ETF Specifications for Instant Messaging and Presence using the Session Initiation Protocol (SIP)", draft-rosenberg-simple-simple-00, Jun. 23, 2007.*
"Cisco Unified Presence 8.0," Data Sheet, Cisco Systems Inc., 2010, 7 pages.
Campbell et al., "Session Initiation Protocol (SIP) Extension for Instant Messaging," RFC 3428, Network Working Group, 2002, 17 pages, retrieved from http://www.ietf.org/rfc/rfc3428.txt.
Campbell et al., "The Message Session Relay Protocol (MSRP)," RFC 4975, Network Working Group, 2007, 64 pages, retrieved from http://toosl.ietf.org/html/rfc4975.
Garcia-Martin et al., "Multiple-Recipient MESSAGE Requests in the Session Initiation Protocol (SIP)," RFC 5365, Network Working Group, 2008, 19 pages, http://tools.ietf.org/html/rfc5365.

(Continued)

*Primary Examiner* — Michael C Lai
(74) *Attorney, Agent, or Firm* — Sheridan Ross P.C.

(57) ABSTRACT

A communication system can create a conversation identifier (ID) for a logical IM conversation. The conversation ID can identify messages that are associated with the same IM conversation. The associated IM messages can be stored in an archive for later use. When a SIP session ends but an IM conversation continues, a SIP server can rebuild the IM conversation with messages retrieved with the conversation ID. Further, an IM conversation can be restarted on a different IM client by retrieving messages from the archive associated with the previously established conversation ID. Thus, the conversation ID ensures that an IM conversation does not end due to system changes or reconfigurations in IM clients.

20 Claims, 10 Drawing Sheets

(56) References Cited

OTHER PUBLICATIONS

Hellstrom et al., "RTP Payload for Text Conversation," RFC 4103, Network Working Group, 2005, 18 pages, http://tools.ietf.org/html/rfc4103.

Jennings et al., "Relay Extensions for the Message Session Relay Protocol (MSRP)," RFC 4976, Network Working Group, 2007, 37 pages, retrieved from http://tools.ietf.org/html/rfc4976.

Klyne et al., "Common Presence and Instant Messaging (CPIM): Message Format," RFC 3862, Network Working Group, 2004, 30 pages, http://tools.ietf.org/html/rfc3862.

Rosenberg et al., "Session Initiation Protocol," RFC 3261, Network Working Group, 2002, 252 pages, retrieved from http://www.rfc-base.org/txt/rfc-2361.txt.

Saint-Andre, "End-to-End Signing and Object Encryption for the Extensible Messaging and Presence Protocol," RFC 3923, Network Working Group, 2004, 26 pages, retrieved from http://www.ietf.org/rfc/rfc3923.txt.

Saint-Andre, "Extensible Messaging and Presence Protocol (XMPP): Core," RFC 3920, Network Working Group, 2004, 85 pages, retrieved from http://www.ietf.org/rfc/rfc3920.txt.

Saint-Andre, "Extensible Messaging and Presence Protocol (XMPP): Instant Messaging and Presence," RFC 3921, Network Working Group, 2004, 100 pages, retrieved from http://www.ietf.org/rfc/rfc3921.txt.

Saint-Andre, "Mapping the Extensible Messaging and Presence Protocol (SMPP) to Common Presence and Instant Messaging," RFC 3922, Network Working Group, 2004, 32 pages, retrieved from http://www.ietf.org/rfc/rfc3922.txt.

Van Wijk et al., "Framework for Real-Time Text over IP Using the Session Initiation Protocol (SIP)," RFC 5194, Network Working Group, 2008, 32 pages, retrieved from http://tools.ietf.org/html/rfc5194.

\* cited by examiner

IM CONTINUATION ACROSS SIP SESSIONS AND ACROSS CLIENTS FOR POINT-TO-POINT AND MULTI-USER CHAT

BACKGROUND

Instant Messaging (IM) can communicate text messages in near real time, making IM useful for conversing with people. Typically an IM conversation, whether it is one-on-one or involves multiple participants, ends when your IM client is closed. If IM is conducted in a Session Initiation Protocol (SIP) system, closing the client terminates the SIP session. Further, IM conversations generally have dead time where there is no activity and messages are not exchanged. SIP generally uses a time out feature to close stagnant SIP sessions. Thus, SIP does not and cannot maintain an IM conversation across multiple SIP sessions. Further, if a user stops an IM session on one IM client, there is no way to restart the IM conversation on another IM client.

SUMMARY

It is with respect to the above issues and other problems that the embodiments presented herein were contemplated. Embodiments described in the present application provide systems and methods for creating a conversation identifier (ID) associated with each IM conversation. The conversation ID can identify messages that are associated with the same IM conversation. The associated IM messages can be stored in an archive for later use. When a SIP session ends but an IM conversation continues, a SIP server can rebuild the IM conversation with messages retrieved with the conversation ID. Further, an IM conversation can be restarted on a different IM client by retrieving messages from the archive associated with the previously established conversation ID.

The conversation ID is defined to indicate that messages that flow back and forth in an instant message interaction are related to the same logical conversation. This conversation ID is defined at the start of new topic, by the initiating user, the IM (software) client, the IM server, or an IM recording application. The definition of a conversation ID allows users to change the conversation ID during the middle of an IM exchange to start a new conversation.

When a user starts up an IM client, the user specifies the conversation ID. If a conversation ID is not specified, then either the client can select one or a conversation ID can be automatically generated. If a conversation ID is specified, a SIP server or IM client can query an IM conversation repository (e.g., IM message archive) to see if the provided messages are associated with a previous IM conversation and continue the conversation. If the message continues a previous conversation, then the transcript of the previous IM exchange(s) may be retrieved, provided to, and displayed in the client. The provision of the past IM exchanges gives context to the user.

One of the key principles of the Session Initiation Protocol (SIP) is that sessions expire. Once a session expiration occurs, the communication is terminated. Using the conversation ID, an IM client can continue the conversation across SIP sessions (dialogs). Further, the embodiment presented herein allow users to change IM clients in the middle of a conversation, and have the transcript of the previous exchanges to be retrieved and displayed.

When the conversation ID capability is combined with multi-user chat (MUC), a new user can join a conversation that is already in progress and receive the full history of the past IM exchanges, which may be subject to security policies. The new user can either be invited into the conversation, or can be given the conversation ID and join at a convenient time.

There is no formal "end" to a conversation. For example, a conversation can be dormant for a long period of time (e.g., a month or a year), and be rejoined and restarted.

The term "communication session," "IM session," or "IM conversation" as used herein refer to any communication or set of communications between IM clients and/or IM servers, whether including audio, video, text, or other multimedia data. Typically, a communication session includes two or more communication endpoints and/or a communication server (e.g., a SIP server).

The term "communication device" or "communication endpoint," which may execute an IM client, as used herein refers to any hardware device and/or software operable to engage in a communication session. For example, a communication device can be an IP-enabled phone, a desktop phone, a cellular phone, a personal digital assistant, a soft-client telephone program executing on a computer system, etc. In embodiments, the communication endpoint is a computer system as described in conjunction with FIGS. 7 and 8.

The term "SIP server" as used herein refers to any hardware, software, or a combination of hardware and software operable to conduct, manage, execute, or otherwise hold a communication session between two or more communication endpoints and/or provide IM or communication services or resources to IM applications. The SIP server may be hardware and/or software included in a server, switch, or computer system as described in conjunction with FIGS. 7 and 8.

The term "Session Initiation Protocol" (SIP) as used herein refers to an IETF-defined signaling protocol, widely used for controlling multimedia communication sessions such as voice and video calls over Internet Protocol (IP). The protocol can be used for creating, modifying and terminating two-party (unicast) or multiparty (multicast) sessions consisting of one or several media streams. The modification can involve changing addresses or ports, inviting more participants, and adding or deleting media streams. Other feasible application examples include video conferencing, streaming multimedia distribution, instant messaging, presence information, file transfer and online games. SIP is as described in RFC 3261, available from the Internet Engineering Task Force (IETF) Network Working Group, November 2000; this document and all other documents describing SIP are hereby incorporated by reference in their entirety for all that they teach.

The term "Text over internet protocol" or "Text over IP" (ToIP) is a means of providing a real-time text service that operates over IP-based networks. ToIP may be as described in ITU-T Multimedia Recommendation F.700 2.1.2.1, RFC 5194, and RFC 4103 available from the Internet Engineering Task Force (IETF) Network Working Group, which documents and all other documents describing ToIP are hereby incorporated by reference in their entirety for all that they teach.

The term "IM" as used herein refers to instant messaging, which is a form of real-time direct text-based communication between two or more people using personal computers or other devices, along with shared clients. The user's text is conveyed over a network, such as the Internet. More advanced instant messaging software clients also allow enhanced modes of communication, such as live voice or video calling. IM, as used with Extensible Messaging and Presence Protocol (XMPP) may be as described in RFC 3920, RFC 3921, RFC 3922, and/or RFC 3923, and as used with the SIP for Instant Messaging and Presence Leveraging Extensions (SIMPLE) protocols, may be as described in RFC 3428, RFC 5365, RFC 4975, RFC 3862, and RFC 4976, available from the Internet Engineering Task Force (IETF) Network Working Group, 202; these documents and all other documents describing IM or XMPP are hereby incorporated by reference in their entirety for all that they teach and for all purposes.

The term "network" as used herein refers to a system used by a communication platform to provide communications between communication endpoints. The network can consist of one or more session managers, feature servers, communication endpoints, etc. that allow communications, whether voice or data, between two users. A network can be any network or communication system as described in conjunction with FIGS. 6 and 7. Generally, a network can be a local area network (LAN), a wide area network (WAN), a wireless LAN, a wireless WAN, the Internet, etc. that receives and transmits messages or data between devices to facilitate communication platform activities. A network may communicate in any format or protocol known in the art, such as, transmission control protocol/internet protocol (TCP/IP), 802.11g, 802.11n, Bluetooth, or other formats or protocols.

The term "database," "archive," or "data structure" as used herein refers to any system, hardware, software, memory, storage device, firmware, component, etc., that stores data. The data model can be any type of database or storage framework described in conjunction with FIGS. 6 and 7, which is stored on any type of non-transitory, tangible computer readable medium. A database can include one or more data structures, which may comprise one or more sections or portions that store an item of data. A section may include, depending on the type of data structure, an attribute of an object, a data field, or other types of sections included in one or more types of data structures. The data structure can represent a text string or be a component of any type of database, for example, relational databases, flat file databases, object-oriented databases, or other types of databases. Further, the data structures can be stored in memory or memory structures that may be used in either run-time applications or in initializing a communication.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "in communication with" as used herein refers to any coupling, connection, or interaction using electrical signals to exchange information or data, using any system, hardware, software, protocol, or format.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" or "computer program product" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the embodiments are considered to include a tangible storage medium and prior art-recognized equivalents and successor media, in which the software implementations of the present embodiments are stored.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the description includes exemplary embodiments, it should be appreciated that individual aspects of the embodiments can be separately claimed.

BRIEF DESCRIPTION OF THE DRAWINGS

The present disclosure is described in conjunction with the appended figures.

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
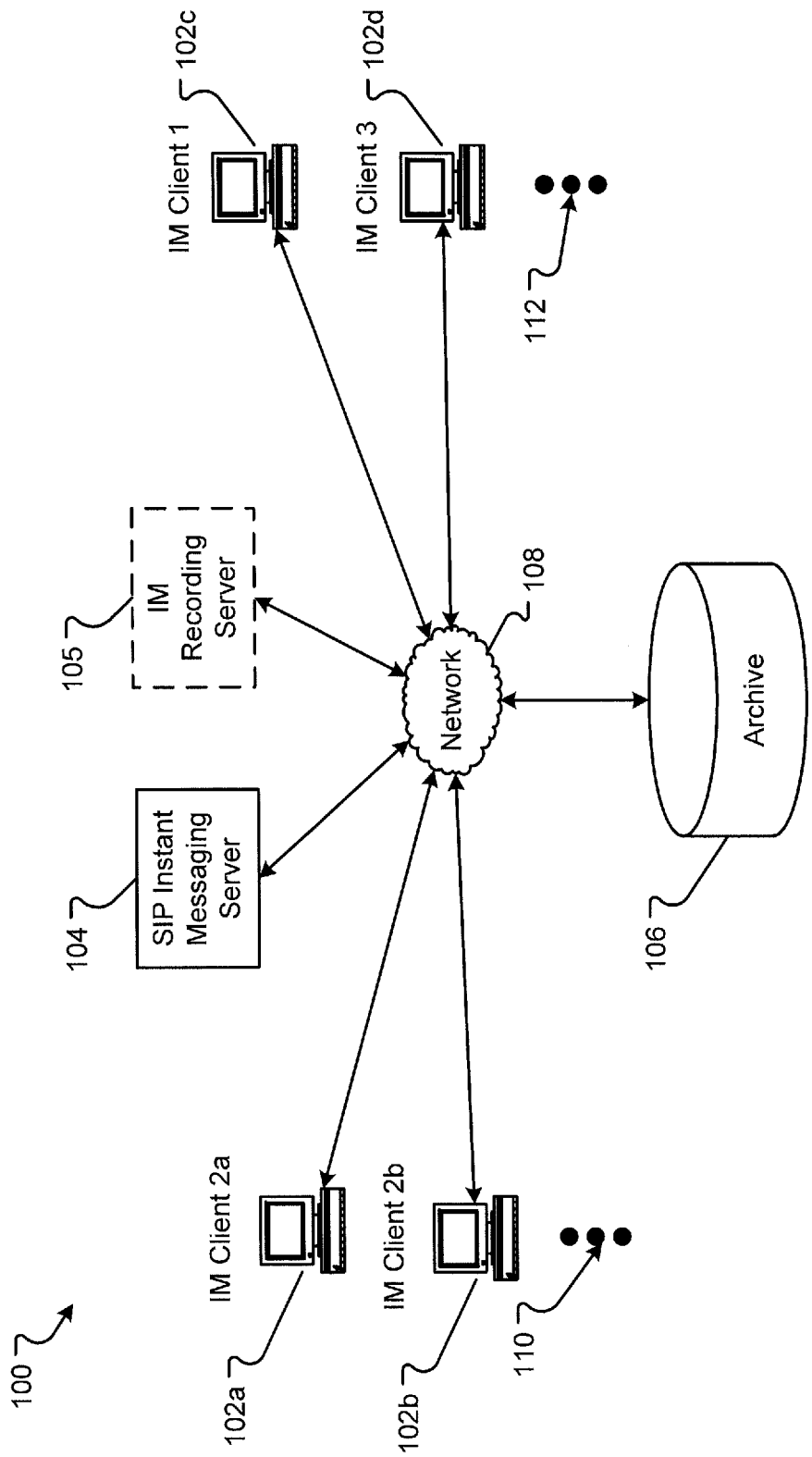
FIG. 1 is a block diagram of an embodiment of a system for conducting an IM communication session.

A system 100 for exchanging instant messages is shown in FIG. 1. The system 100 can include one or more components, which can be hardware and/or software associated with computer systems, as described in conjunction with FIGS. 7 and 8. The components can include two or more instant message clients 102a, 102b, 102c, and/or 102d. An instant message client 102, for example IM client 2a 102a, can be a software application executing on a computer system that is operable to exchange instant messages with another instant message client, for example IM client 2b 102b, which may be located on a separate computer system and may be geographically separated from the other instant message client(s) 102a. The instant messages may be communicated through a network 108, which can be any kind of network as described in conjunction with FIGS. 7 and 8. The instant messages may be conducted through the network 108 by an instant messaging server 104. In alternative embodiments, the IM message is sent directly from the IM client 102a to IM client 102c without the involvement of the SIP IM server 104. However, an IM recording server 105 may also receive a copy or "tap" the IM conversation to record the IM messages in the archive 106. Thus, an IM recording server 105 can archive and retrieve messages from the archive 106 without involvement in the SIP session creation or maintenance or in the exchanging of IM messages. The IM recording server 105 can complete at least some of the functions hereinafter described for the SIP IM server 104.

Figure 7:
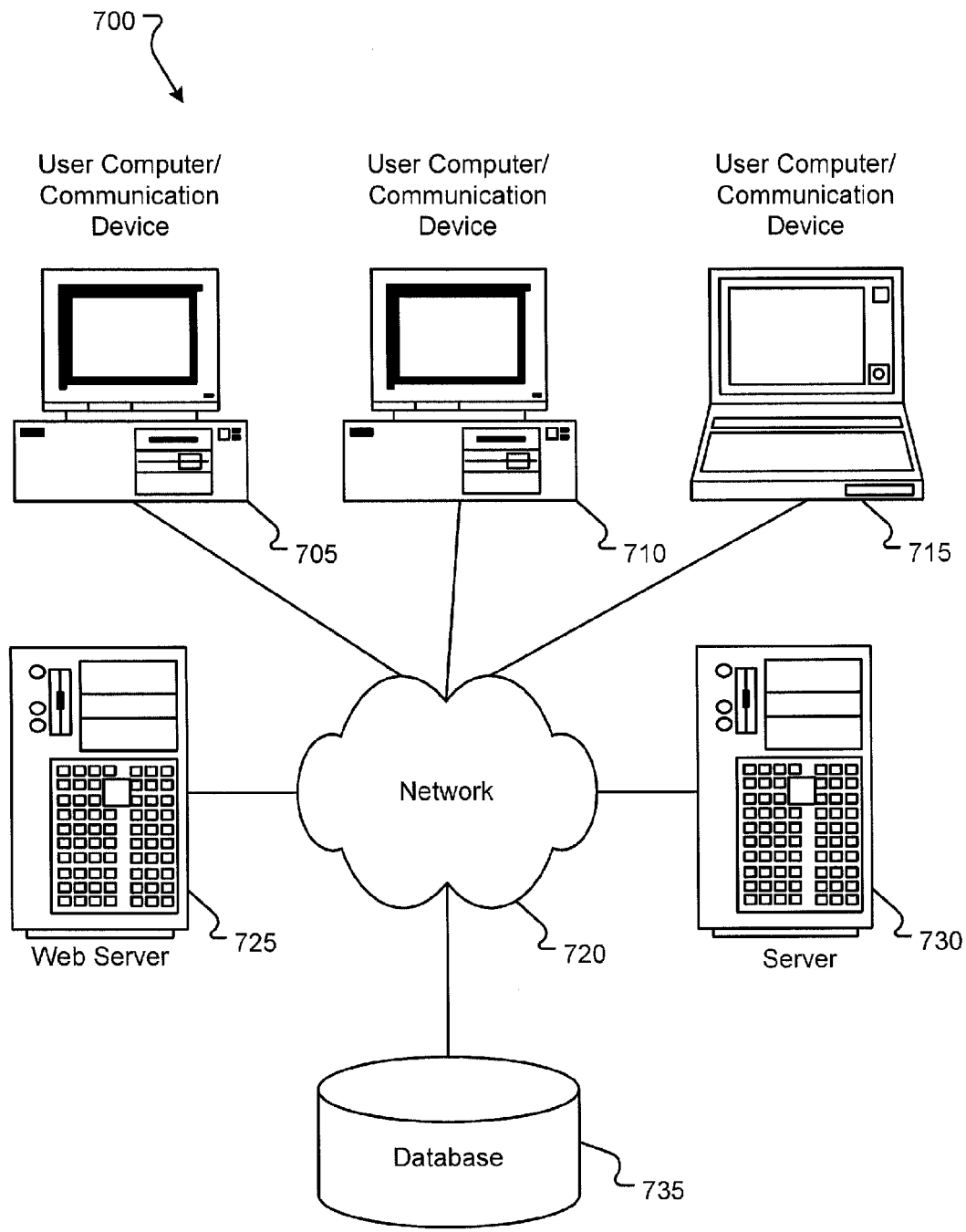
FIG. 7 is a block diagram of an embodiment of a computing environment operable to execute the embodiments described herein.
Figure 8:
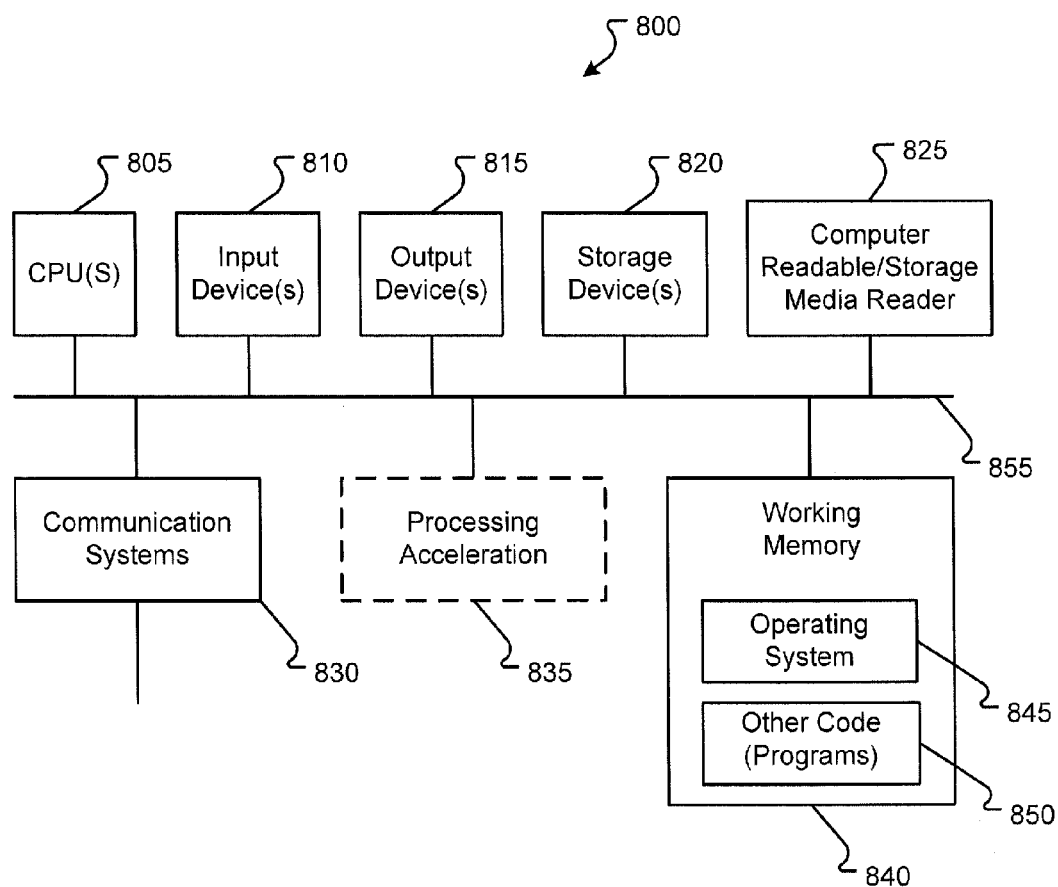
FIG. 8 is a block diagram of an embodiment of a computer or computing system environment operable to execute as the one or more devices described herein.

An instant messaging server 104 can be a communication server or other computer system as described in conjunction in FIGS. 7 and 8. In embodiments, the instant messaging server 104 is a session initiation protocol (SIP) server that can exchange IM messages. Hereinafter, without limiting the embodiments, the instant messaging server 104 will be described as a SIP instant messaging server 104. As such, the SIP instant messaging server 104 can create and conduct SIP sessions to exchange instant messages using ToIP or other protocols to exchange the instant messages during a SIP session. However, it may be possible to use other types of instant messaging servers, for example XMPP, to exchange instant messaging messages in accordance with the embodiments presented herein.

The SIP instant messaging server 104 can receive and relay messages from and for one or more instant messaging clients. Further, the SIP instant messaging server 104 or the IM recording server 105 can archive instant messages from one or more instant message sessions into an archive 106. An archive 106 can be any database as described in conjunction with FIGS. 7 and 8. An archive 106 is operable to store one or more messages for one or more IM sessions using storage methodology. The data structures and storage of IM messages may be as explained in conjunction with FIG. 3.

IM client 2a and IM client 2b, 102a and 102b respectively, can be two software clients executed on separate computers associated with the same user. As such, a user may begin an IM session on a first client, e.g., IM client 2a 102a, and continue or finish the IM session on a second IM client, e.g., IM client 2b 102b. The first user may have more or fewer IM clients, which may be used during an IM session, than those shown in FIG. 1 as represented by ellipses 110. The user can send an instant message to another IM client, for example IM client 1 102c or IM client 3 102d. There may be more or fewer IM client recipients than those shown in FIG. 1, as represented by ellipses 112. In embodiments, the instant messages may be shared during a multi-user chat, such that there may be two or more IM clients, e.g., 102a, 102c, and 102d, involved in a single IM session.

Figure 2:
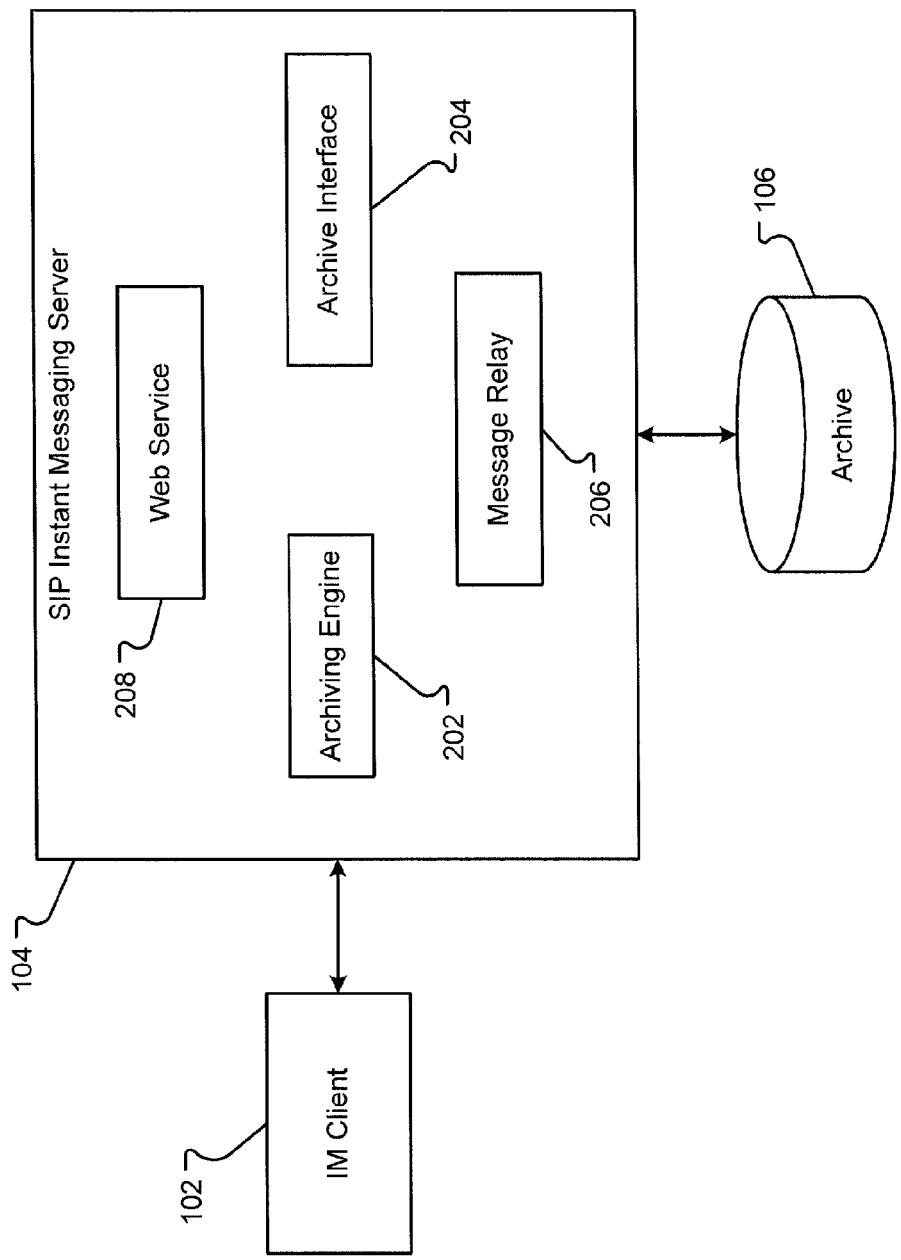
FIG. 2 is a block diagram of an embodiment of a SIP IM server operable to conduct an IM conversation over one or more SIP sessions.

An embodiment of the SIP messaging server 104 is shown in FIG. 2. The SIP instant messaging server 104 can include one or more components which may be hardware and/or software associated with one or more computer systems, as explained in conjunction with FIGS. 7 and 8. In embodiments, the SIP instant messaging server 104 includes an archiving engine 202, an archive interface 204, a message relay 206, and/or a web service 208. The SIP messaging server 104 is operable to communicate with one or more instant messaging clients 102 and the archive 106, to perform functions as described herein.

An archiving engine 202 is operable to intercept instant messages sent from one or more instant messaging clients 102 and archive the instant messages into the archive 106. The archiving engine 202 is also operable to create the one or more data structures as stored in the archive 106, as explained in conjunction with FIG. 3. Thus, during a new IM session, the archive engine 202 can create a new archive for the instant messages that are exchanged during that newly-created IM session. Further, the archiving engine 202 can create or manage any data required to organize or store the instant messages into the archive 106, as explained in conjunction with FIG. 3. In alternative embodiments, the archiving engine 202 may be separate from the SIP instant messaging server 104.

An archive interface 204 is operable to search, modify, or retrieve information from the archive 106. For example, an instant message client 102 may be able to search for old instant message session and retrieve the messages associated with the old IM session to add to the IM session or to conduct other operations on either the IM messages or the metadata associated with the IM session. In embodiments, the archive interface 204 also communicates with the message relay 206 to provide historical IM messages (that is, the IM session context) for an IM session, if an old IM session is restarted. Further, the archive interface 204 can communicate with any of the other components associated with the SIP instant messaging server 104 to exchange data.

A message relay 206 can be any software or hardware associated with receiving and sending instant messages between IM clients 102. As such, the message relay 206 can receive an instant message from a first instant message client 102a and forward that instant message to the intended recipient, IM client 102c. In embodiments, the message relay 206 is also operable to create and manage a SIP session associated with the IM session. Thus, upon receiving a first instant message from a sender, the message relay 206 may create a SIP session between the sender 102a and the recipient 102c. The SIP session may be monitored by the message relay 206, which may determine if the SIP session times out or should be reestablished.

A web service 208 is operable to allow an instant message user to interface with the SIP instant messaging server 104. The web service 208 is operable to provide interfaces for the IM client 102, such that IM client 102 may exchange information associated with the user or with an IM session. For example, the web service 208 can provide interfaces and store information regarding security or privacy policies to be associated with the instant message user or an instant message session. This security and privacy information may be stored, by the web service 208, in the archive 106 as metadata or other information.

Figure 3:
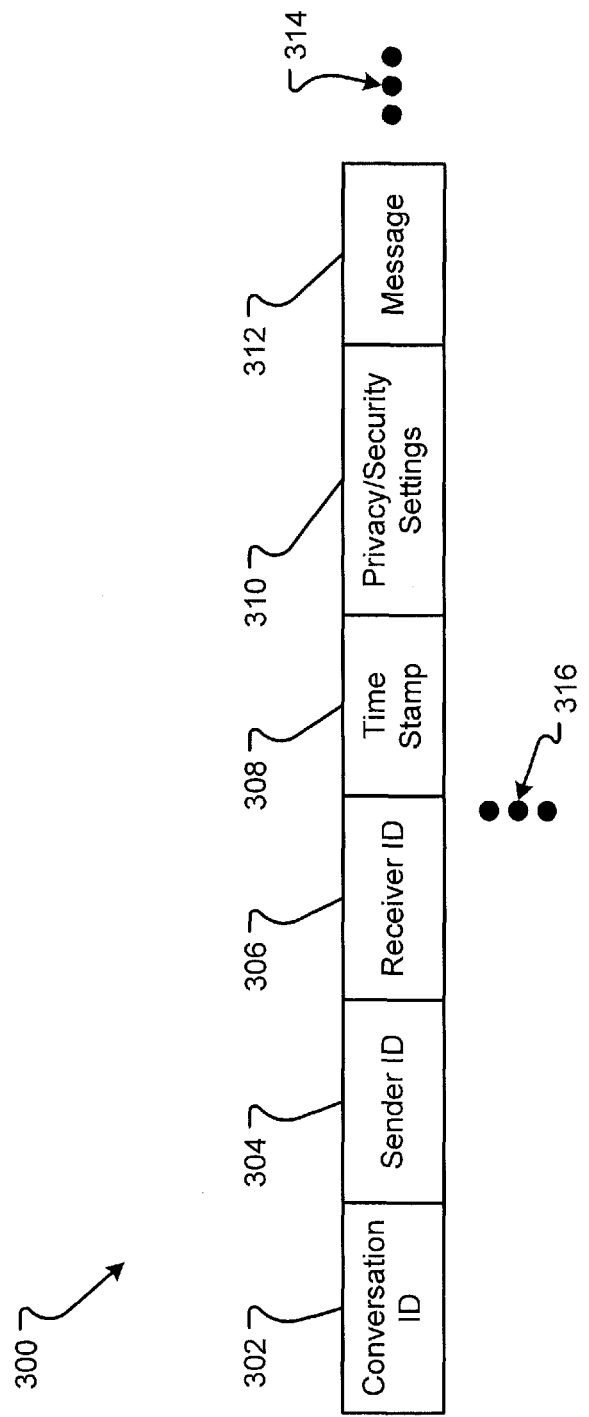
FIG. 3 is an embodiment of a data structure operable to store information associated with a logical IM conversation.

An embodiment of information stored in the archive 106 is shown in FIG. 3. This information may include one or more data structures 300 that contain one or more portions storing different types of data within each portion of the data structure 300. The data structure 300 and other information stored within the archive 106 may be stored as a database or other type of storage, as explained in conjunction with FIGS. 7 and 8. The data structure 300 may include more or fewer fields than those shown in FIG. 3, as represented by ellipses 314. Further, there may be more data structures than that shown in FIG. 3, as represented by ellipses 316. A portion of the data structure 300 can be a data field that stores a type of data. In embodiments, the portions of the data structure 300 can include a conversation identifier (ID) 302, a sender ID 304, a receiver ID 306, a time stamp 308, one or more privacy or security settings 310, and a message text 312 during the instant messaging session.

The conversation ID 302 can be any numeric, alphanumeric, or symbolic representation that uniquely identifies the instant messaging conversation from all other instant messaging conversations. Each instant messaging conversation, which may include one or more messages, can have a unique conversation ID 302. Thus, each data structure 300 associated with the same conversation will have the same conversation ID 302 but may include different data for the other portions of the data structure 300. The conversation ID 302 may be searchable, opaque, and allow for the discovery of the conversation. Further, the conversation ID 302 logically relates the messages in the IM session, which can be located by searching the other fields in the data structure 300. Thus, a user can obtain a history of the conversation by obtaining all messages 312, associated with the same conversation ID 302, as ordered by the time stamp 308.

A sender ID 304 can be any identifier for the sender of the instant message 312. The sender ID can be a username, an email address, or other unique identifier. In some embodiments, the sender ID 304 can be a globally unique identifier (GUID). The GUID can be automatically generated and associated with the user and used in the archive 106 to identify the sender. The receiver ID 306, similar to the sender ID 304, can be a unique identifier which may be a username, an email address, a GUID, or other identifier for the person or system receiving the instant message. In embodiments, the receiver ID 306 can include two or more identifiers for two or more people or systems because one message may be sent to more than one user in a multiuser chat.

A time stamp 308 can be a date and time or other time measure, as known in the art, to identify when the message was sent and/or received. The time stamp 308 can also be associated with the time when the message 312 was relayed through the message relay 206 to the user having the receiver ID 306. Privacy and security settings 310 can, in embodiments, be associated with the conversation identified by the conversation ID 302. Thus, the privacy and security settings 310 can establish how the messages in the conversation are to be treated. For example, the privacy settings 310 may establish which messages may be shared with which users that may be added to the conversation at a later time. Thus, the privacy settings 310 can dictate which historic messages, from an IM conversation, are provided to an added recipient. Thus, the privacy settings 310 manage how information is to be shared among the parties associated with the conversation. In embodiments, the privacy and security settings 310 can also be associated with a user. For example, a sender, identified by sender ID 304, can have specific privacy and security settings 310 associated with each message the user sends. These unique sender settings can be stored in the privacy and security settings 310 for every message sent by the sender. The user settings can include whether the messages are to be viewed by later-added parties, whether another party may add a user to the IM conversation, etc.

The message body 312 can include the message text or other media (e.g., video, pictures, music, graphics, etc.) from the message sent during an IM conversation identified by the conversation ID 302. As such, as each message is sent during the IM conversation, a new data structure 300 can be created. Thus, for several messages that are sent during an IM conversation, there will be several data structures 300, each data structure 300 having the same conversation ID 302, having different messages 312, and having other information that may be similar or different. For example, each message should have a different time stamp 308, but may have the same sender ID and/or receiver ID 306. The messages 312 can be retrieved for the IM conversation and provided to a user as a historical context to the IM conversation.

Figure 4A:
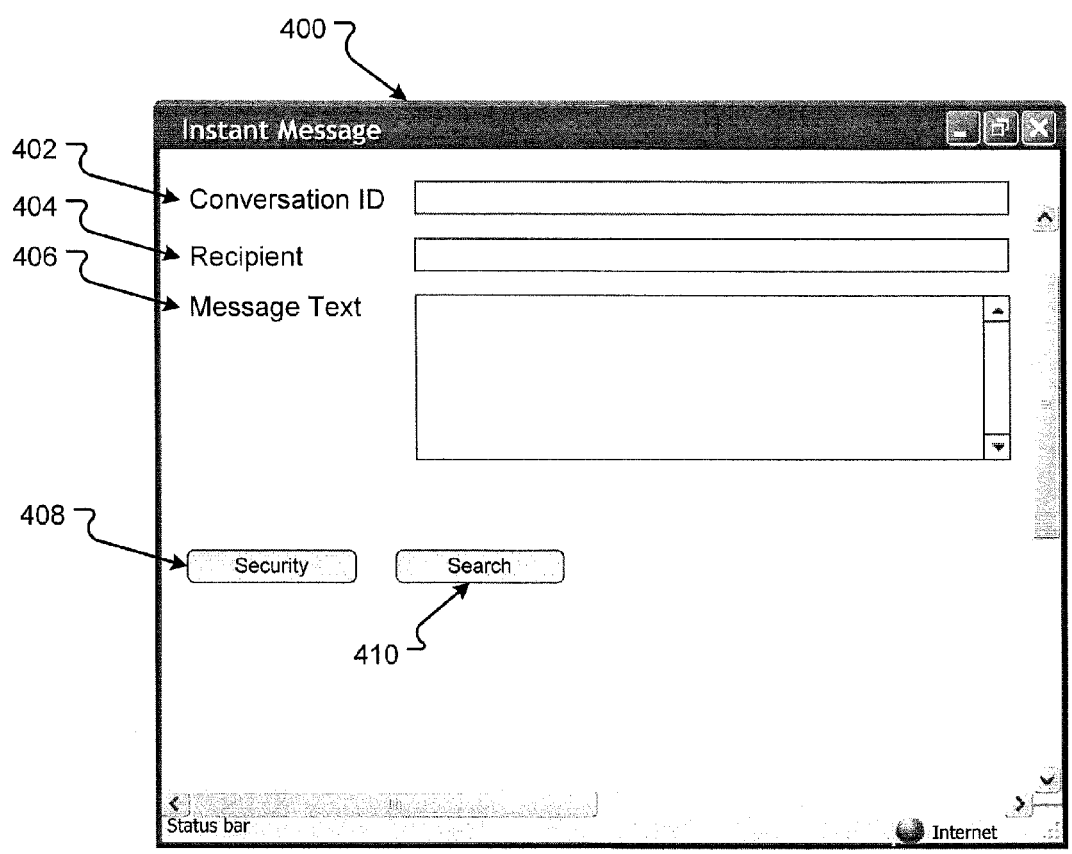
FIGS. 4A-4C are embodiments of user interfaces used to exchange IM messages or conduct other operations associated with an IM conversation.

An embodiment of a user interface 400 is shown in FIG. 4A. A user interface, as described herein, can be a window or other display rendered on a user interface display, as described in conjunction with FIGS. 7 and 8. The user interface 400 is an embodiment of a user interface used to send instant messages with the system described in conjunction with FIG. 1. A user interface 400, or those described hereinafter, can each have unique portions that display data or receive inputs or selections from a user. The selections may be received through an input device (e.g., a mouse, keyboard, etc.) selecting a user interface device, which may include one or more of, but is not limited to, a menu, a drop down menu, a button, a radio button, a text field, or other type of user selection area or device. In embodiments, the user interface 400 includes a conversation ID text field 402, a recipient text field 404, a message text field 406, a security settings button 408, and/or a search button 410. A send button is not shown but can also be provided in the user interface display. The send button can operate to send the instant message after at least some of the information described hereinafter is provided.

A conversation ID text field 402 can accept or present the conversation ID, which may be the same as the conversation ID 302 described in conjunction with FIG. 3. In embodiments, the conversation ID may be automatically generated and displayed by the message relay 206 or archiving engine 202 when a new conversation is started. In other embodiments, a user may type in or enter a conversation ID, in the conversation ID text field 402, to resume or to add to a previous IM conversation. In embodiments, the message relay 206 or archiving engine 202 can automatically enter and provide the last conversation ID into the conversation ID text field 402, such that the user can resume a conversation that was previously started. The user interface 400 may modify the Conversation ID to present it in a format that is easier for the user to understand than the conversation ID 302. For example, the user interface 400 may present the parties in the IM conversation, a topic, text from a message, a time of a message, etc.

The recipient field 404 includes the one or more recipients engaged in the IM conversation and are to receive the instant message. The recipient(s), listed in the recipient field 404, can be the same or similar to the recipients listed by receiver ID 306 (i.e., the addresses entered for the recipients may be used as the receiver IDs in the received ID field 306). Thus, the recipient field may include one or more e-mail addresses or IM addresses that identify the recipients uniquely. As with the conversation ID 402, the recipients listed in the recipient field 404 may be automatically generated from a previous instant message.

A message text field 406 can contain the instant message text or the other media contained in the message that is to be sent to the recipients. The message text 406 can be the same as the message 312 stored in the data structure 300.

Security button 408 may be selected by the user to set the privacy and security settings 310. Upon selection of the security button 408, a securities user interface 412, as described in conjunction with 4B, can be rendered and presented o the user on the user interface display. A search button 410 can be selected to search for an IM conversation. Upon selecting the search button 410, a search user interface 420, as described in conjunction with FIG. 4C, can be rendered and displaced for the user on the user interface display.

Figure 4B:
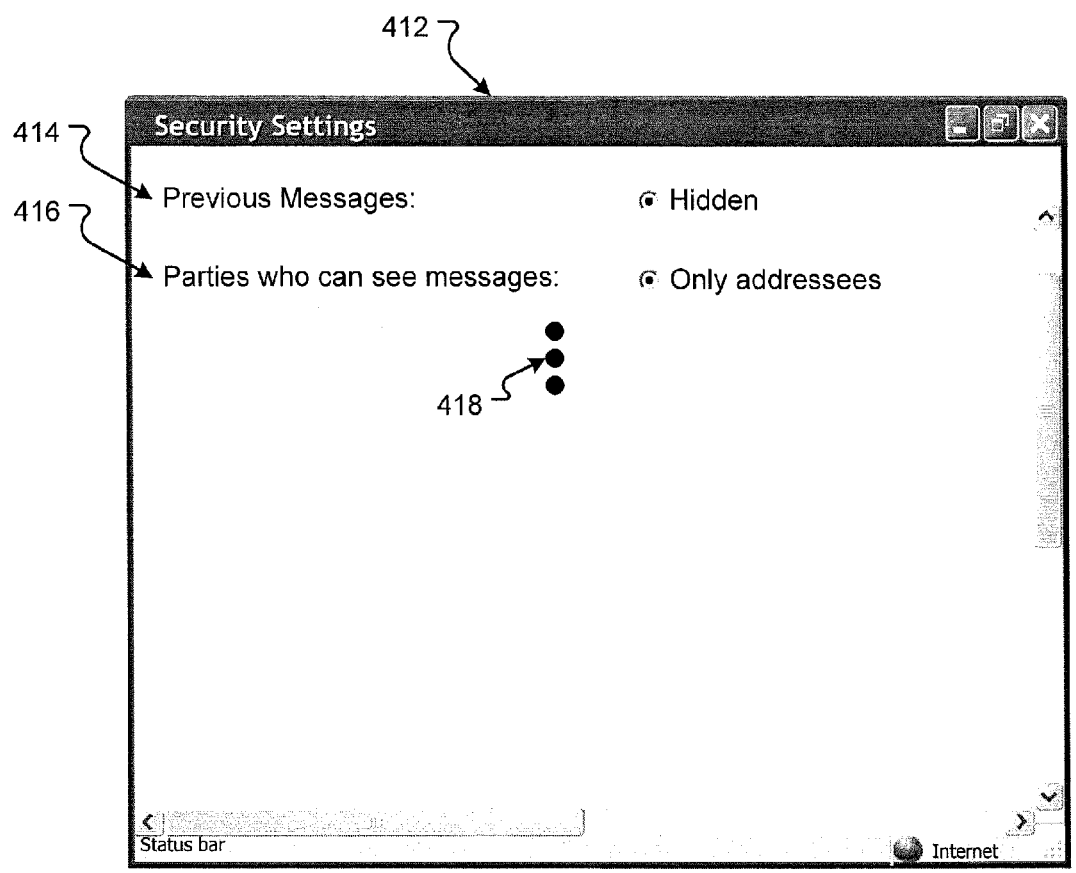

An embodiment of a user interface display 412 for setting the privacy and security settings is shown in FIG. 4B. User interface display 412 can include one or more selectable options for setting security settings. In an embodiment, a first section may allow the user to hide all IM messages previous to the current instant message by selecting a radio button 414. Thus, if the user wants to add a new recipient, this setting 414 can insure that that new recipient does not see any previous instant message in the IM conversation. In another embodiment, the user may allow only the recipients who receive that instant message to see the messages to which those recipients are addresses when selecting the radio button 416. Thus, if the number or composition of the recipients changes from instant message to instant message, only those recipients listed in the instant message address field 404 will be able to see that instant message. If a user is added for some messages but not others, they would only see the messages for which they were a listed recipient. There may be more security settings, as one skilled in the art would understand, that may be set in user interface display 412, as represented by ellipses 418.

Figure 4C:
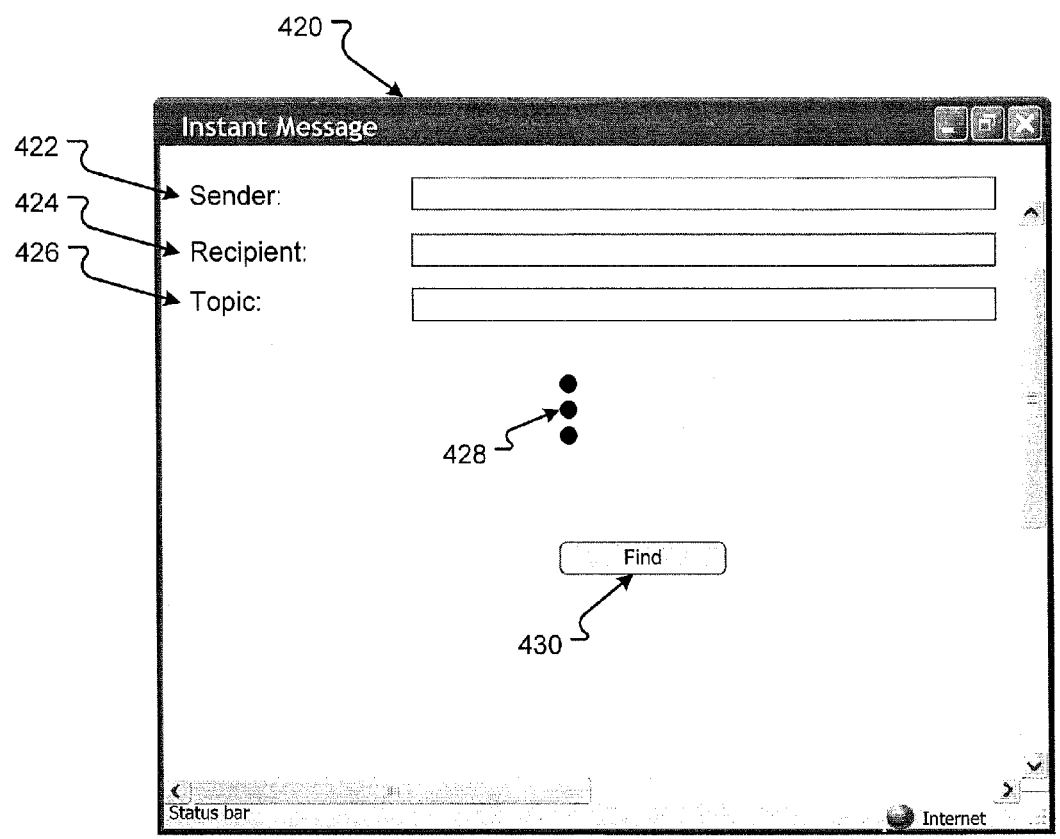

An embodiment of a user interface 420 for searching instant messaging conversations is shown in FIG. 4C. The user interface 420 can include one or more fields for accepting search criteria. The search criteria may correspond to one or more fields listed in the data structures 300. For example, the user may enter a sender ID 304, in a sender ID section 422; may enter one or more recipient ID's 306, in recipient field 424; or, may enter a topic, in a topic field 426, which can be used to search the message text 312. There may be more or fewer fields than those shown in user interface display 420, as represented by ellipses 428. Upon entering the information the user wishes to search, the user may select the find button 430 to conduct the search. The archive interface 204 can than search the data structure 300 for the information. The system 100 can return one or more conversation ID's 302 (and possibly some of the message text) that may relate to the searched information. The user may select one of those conversation ID's in another user interface display (not shown) to restart the IM conversation.

Figure 5:
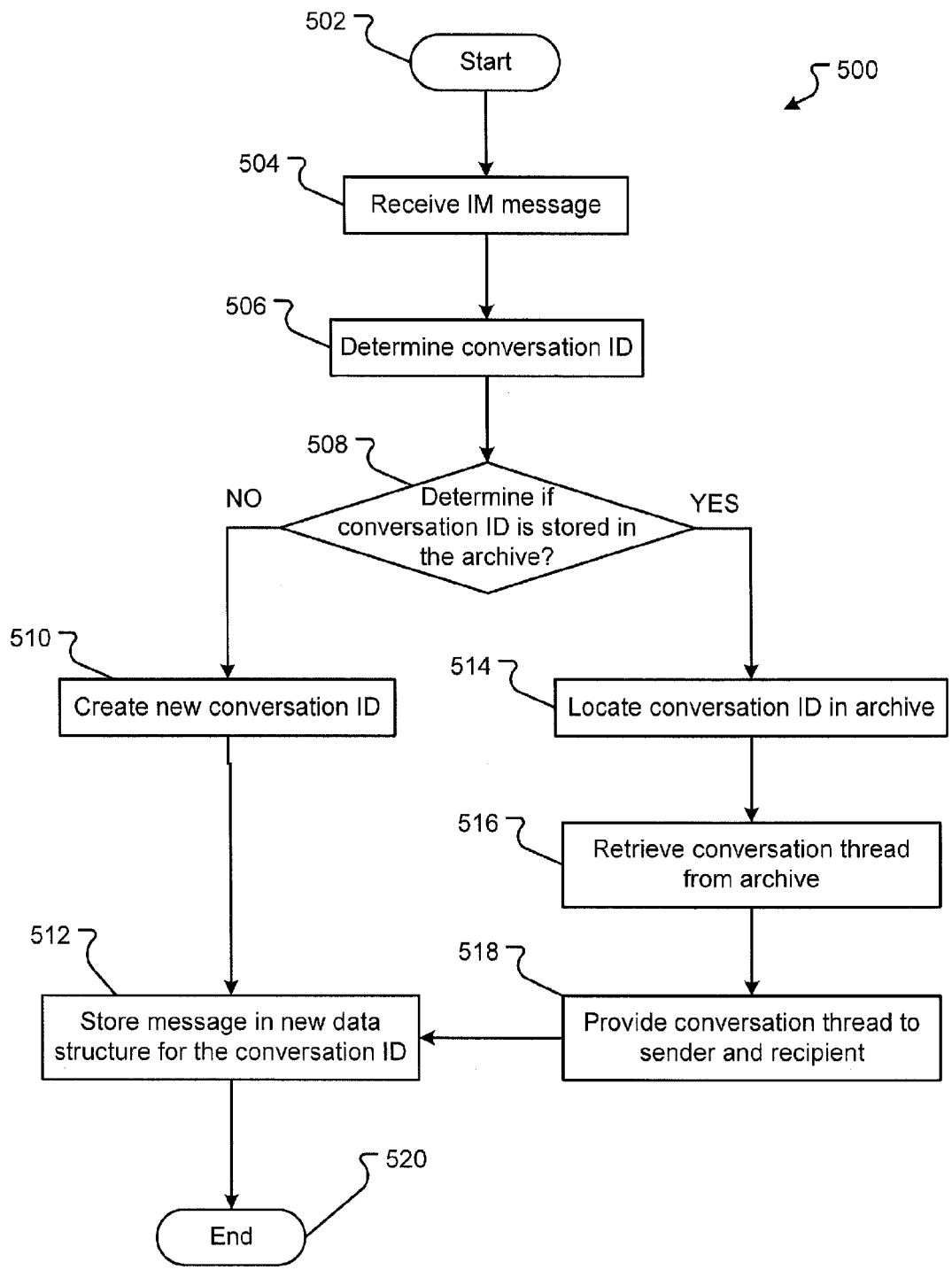
FIG. 5 is a flow diagram of an embodiment of a process for sending an IM message during a communication session, for example, a SIP session.

An embodiment of a process for conducting an instant messaging session is shown in FIG. 5. Generally, the method 500 begins with a start operation 502 and terminates with an end operation 520. While a general order for the steps of the method 500 are shown in FIG. 5, the method 500 can include more or fewer steps or arrange the order of the steps differently than those shown in FIG. 5. The method 500 can be executed as a set of computer-executable instructions executed by a computer system and encoded or stored on a computer readable medium. Hereinafter, the method 500 shall be explained with reference to the systems, components, modules, data structures, user interfaces, etc. described in conjunction with FIGS. 1-4C.

An instant message is received, in step 504. In embodiments, an IM client 102a sends an instant message to the SIP instant messaging server 104 to be sent to another IM client 102c. The IM client 102a may accept input, into an instant message user interface 400, which can include the message 406 to be sent to a recipient listed in the recipient section 404. The user can send the message, which is then forwarded by the IM client 102a to the SIP instant messaging server 104. For example, IM client 2a 102a, sends the instant message through a network 108 to the SIP instant messaging server 104, where the message is received by the message relay component 206.

The message relay 206 determines a conversation ID for the IM conversation, in step 506. In embodiments, the message relay 206 (or the archiving engine 202) determines if a conversation ID was input in the conversation ID field 402 and provided in the instant message. The IM client 102a may automatically generate a new conversation ID for new IM conversations or may allow the SIP instant messaging server 104 to generate the conversation ID. After determining if the conversation ID 402 was provided, the message relay 206 (or the archiving engine 202) can determine if the conversation ID is stored in the archive 106, in step 508. In embodiments, the message relay 206 (or the archiving engine 202) can search the conversation ID field 302 of one or more data structures 300 in the archive 106. If the conversation ID 302 is found, step 508 proceeds YES to step 514. If no conversation ID is found in the archive 106, the step 508 proceeds NO to step 510.

The archiving engine 202 can create a new conversation ID in step 510. The message relay 206 can send a signal to the archiving engine 202 to create a new conversation ID for a conversation which currently has no conversation ID. The archiving engine 202 can create the new conversation ID that will be used with any subsequent messages related to the IM conversation. The archiving engine 202 may then create the data structure 300 and store the message and other data, including the conversation ID 302, in the new data structure 300 in the archive 106, in step 512. Thus, the archiving engine 202 creates a data structure 300. Upon creating the data structure 300, the archiving engine 202 stores the conversation ID 302, stores the sender ID 304 provided in the metadata of the IM message received from the IM client 102a, and stores the one or more recipients, listed in the recipient filed 404, in the recipient ID field 306. Further, the archiving engine 202 can determine the time when the message was sent/received and store that timing information as the time stamp 308. If any privacy or security settings were set, either by the IM client 102a or by the user in the user interface 412, or by system policies, the archiving engine 202 can store the received settings in the privacy and security settings 310. The archiving engine 202 can also store the message text or other media, from the message text field 406, into the message field 312 of the data structure 300. Upon creating the data structure and storing the information in the archive 106, the archiving engine 202 can send a signal to the message relay 206 that the IM message can be sent. The message relay 206 may then send the message to the recipient IM client 102c.

In step 514, the archiving interface 204 attempts to locate the conversation ID, provided in field 406, in the archive 106. The archive interface 204 can search for the provided conversation ID in each of the conversation ID fields 302 in the one or more data structures stored in the archive 106. In embodiments, the archive interface 204 can sort or arrange the data structures 300 to better search the archive 106. Upon finding the one or more data structures 300 having messages 312 associated with the same conversation ID 302, the archive interface 204 can retrieve the message information and the conversation thread from the archive 106, in step 516. Thus, the archive interface 204 can retrieve the messages and date order the messages according to the time stamp 308 to provide the IM conversation thread to the message relay 206. In alternative embodiments, the previous message thread may be retrieved before a message is sent.

The message relay 206 may first create a SIP session between the sender and the one or more recipients, as is known in the art. Then, the message relay 206 can then send the current IM message, provided in the message interface 402, and the previous messages from the conversation thread, provided from the archive interface 204, to the recipient(s), in step 518. Further, the message relay 206 can send the conversation thread (if need be) to the sender of the IM message. Thus, the message sent from the sender to the recipient(s) can be forwarded from the SIP instant messaging server 104 to the second IM client 102a. Further, the message script of previous messages, ordered by time stamp, may then also be sent to the sender and recipient to be displayed in the message interface 402. In alternative embodiments, the IM client 102a can retrieve the previous message thread (for example, by using user interface 420) before sending an instant message. Thus, the previous message thread can be pulled by the IM client 102 rather than the previous message thread being pushed to the participants.

Figure 6:
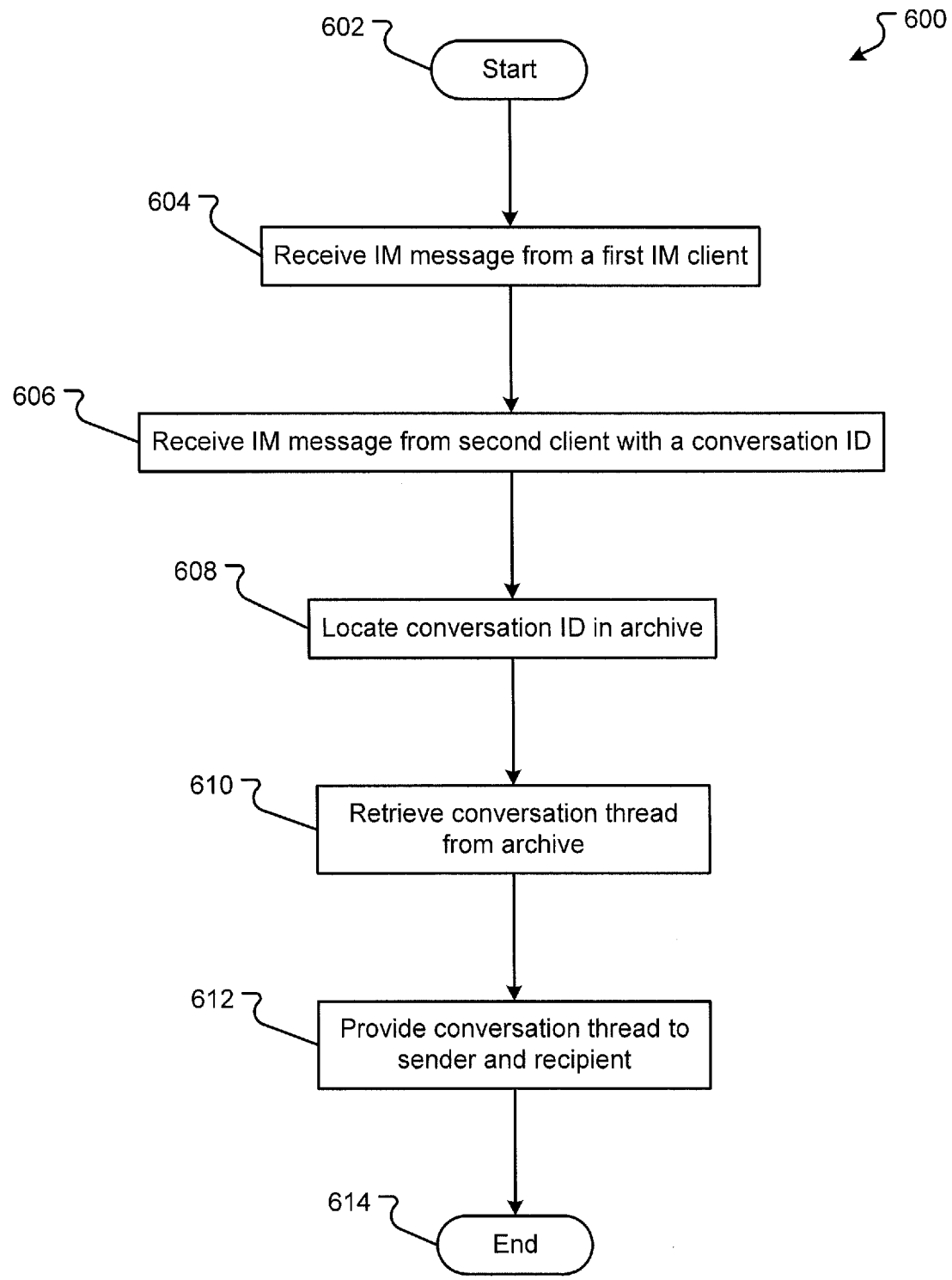
FIG. 6 is a flow diagram of an embodiment of a process for conducting an IM conversation using two IM clients.

An embodiment of a method 600 for conducting an instant messaging session over multiple clients is shown in FIG. 6. Generally, the method 600 begins with a start operation 602 and terminates with an end operation 614. While a general order for the steps of the method 600 are shown in FIG. 6, the method 600 can include more or fewer steps or arrange the order of the steps differently than those shown in FIG. 6. The method 600 can be executed as a set of computer-executable instructions executed by a computer system and encoded or stored on a computer readable medium. Hereinafter, the method 600 shall be explained with reference to the systems, components, modules, data structures, user interfaces, etc. described in conjunction with FIGS. 1-4C.

An instant messaging server 104 can receive a first IM message from a first IM client 2a 102a, in step 604. Thus, the user can start an IM session from a first IM client 102a, by sending a first IM message to the SIP instant messaging server 104. The instant message can be forwarded to another IM client, for example IM client 1 102c, and/or IM client 3 102d. The initial IM session may continue with messages relayed between the IM client participants. At some time thereinafter, the same user may stop sending messages and may open a second, different IM client, for example IM client 2b 102b, to send another IM message.

The SIP instant message server 104 can receive the second IM message from the second IM client 2b 102b, where the IM message has the same conversation ID, in step 606. Thus, the user continues the same IM session using a different IM client. In this scenario, there is a pause in the IM session, as the user switches IM clients. However, the IM session can continue even with another IM client because the previous messages have the same conversation ID and can be retrieved.

Upon receiving the second IM message, the message relay 206 (or the archiving engine 202) can retrieve the conversation ID in the provided message. This conversation ID can be provided to the archive interface 204. The archive interface 204 can locate the conversation ID received from the message relay 206 (or the archiving engine 202) in the archive 106, in step 608. Upon locating the one or more data structures 300 having the same conversation ID 302, the archive interface 204 can retrieve the conversation thread composed of the several messages stored in the message fields 312 of the several data structures 300 in the archive 106, in step 610. The messages may be ordered according to time stamp and provided back to the message relay 206. The message relay 206 can then provide the conversation thread and the new IM message to the recipient, IM client 102c, and provide the previous messages thread to the sender IM client 2b 102b, in step 612. Thus, the message relay 206 sends the past history of the IM session back to the IM client 2b 102b. By sending information through the user interface 420 to the archive interface 204, an IM client 102 can also retrieve the previous message thread. This provision of the previous message thread allows the instant message user interface 402 to display the previous messages sent during the previous IM session when the user was using IM client 2a 102a. Thus, the user can switch IM clients.

In alternative embodiments, the SIP instant messaging server 104 may timeout SIP sessions during an IM session. For example, when an instant messaging session has long pauses between sent messages, a timeout for the SIP session may occur. Thus, the SIP instant messaging server 104 will have to deconstruct the SIP session. Upon receiving another instant message, the SIP instant messaging server 104 can use the conversation ID to create a new SIP session and restore the IM conversation, as described in conjunction with FIG. 6, between the IM clients 102 to send the instant message. Further, the SIP instant messaging server 104 can retrieve the past messages to continue seamlessly the IM session without the IM clients 102 perceiving a stoppage with the SIP session, In embodiments, the archive 106 may be embodied as a separate storage system in the cloud. In alternative embodiments, the archive 106 may be a part of the SIP instant messaging server 104 or one or more IM clients 102. There may be two or more archives that replicate data between them, although only one archive 106 is shown in FIG. 1.

Using the methods described in conjunction with FIGS. 5 and 6, a SIP instant messaging server 104 can conduct IM sessions across multiple SIP sessions and/or with multiple IM clients. Thus, if a SIP session ends during an IM conversation, the SIP instant messaging server 104 can continue the IM conversation in a new SIP session and provide the previous message thread to the IM clients. With the previous message thread displayed with any current IM message, it appears, to the IM clients, that the IM conversation is uninterrupted. Further, a person may join the IM conversation at a later time, e.g., a third user using a fourth IM client 102d can join after being invited to an already started IM conversation. The past history of the IM conversation may be presented to the newly joined user with the current IM message.

FIG. 7 illustrates a block diagram of a computing environment 700 that may function as system or environment for the embodiments described herein. The system 700 includes one or more user computers 705, 710, and 715. The user computers 705, 710, and 715 may be general purpose personal computers (including, merely by way of example, personal computers and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 705, 710, 715 may also have any of a variety of applications, including for example, database client and/or server applications, and web browser applications. Alternatively, the user computers 705, 710, and 715 may be any other electronic device, such as a thin-client computer, Internet-enabled mobile telephone, and/or personal digital assistant, capable of communicating via a network (e.g., the network 720 described below) and/or displaying and navigating web pages or other types of electronic documents. Although the exemplary system 700 is shown with three user computers, any number of user computers may be supported.

System 700 further includes a network 720. The network 720 can be any type of network familiar to those skilled in the art that can support data communications using any of a variety of commercially-available protocols, including, without limitation, TCP/IP, SNA, IPX, AppleTalk, and the like. Merely by way of example, the network 720 maybe a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, the Bluetooth™ protocol known in the art, and/or any other wireless protocol); and/or any combination of these and/or other networks.

The system 700 may also include one or more server computers 725, 730. One server may be a web server 725, which may be used to process requests for web pages or other electronic documents from user computers 705, 710, and 715. The web server can be running an operating system including any of those discussed above, as well as any commercially-available server operating systems. The web server 725 can also run a variety of server applications, including HTTP servers, FTP servers, CGI servers, database servers, Java servers, and the like. In some instances, the web server 725 may publish operations available operations as one or more web services.

The system 700 may also include one or more file and or/application servers 730, which can, in addition to an operating system, include one or more applications accessible by a client running on one or more of the user computers 705, 710, 715. The server(s) 730 may be one or more general purpose computers capable of executing programs or scripts in response to the user computers 705, 710 and 715. As one example, the server may execute one or more web applications. The web application may be implemented as one or more scripts or programs written in any programming language, such as Java™, C, C#™ or C++, and/or any scripting language, such as Perl, Python, or TCL, as well as combinations of any programming/scripting languages. The application server(s) 730 may also include database servers, including without limitation those commercially available from Oracle, Microsoft, Sybase™, IBM™ and the like, which can process requests from database clients running on a user computer 705.

The web pages created by the web application server 730 may be forwarded to a user computer 705 via a web server 725. Similarly, the web server 725 may be able to receive web page requests, web services invocations, and/or input data from a user computer 705 and can forward the web page requests and/or input data to the web application server 730. In further embodiments, the server 730 may function as a file server. Although for ease of description, FIG. 5 illustrates a separate web server 725 and file/application server 730, those skilled in the art will recognize that the functions described with respect to servers 725, 730 may be performed by a single server and/or a plurality of specialized servers, depending on implementation-specific needs and parameters. The computer systems 705, 710, and 715, file server 725 and/or application server 730 may function as servers or other systems described herein.

The system 700 may also include a database 735. The database 735 may reside in a variety of locations. By way of example, database 735 may reside on a storage medium local to (and/or resident in) one or more of the computers 705, 710, 715, 725, 730. Alternatively, it may be remote from any or all of the computers 705, 710, 715, 725, 730, and in communication (e.g., via the network 720) with one or more of these. In a particular set of embodiments, the database 735 may reside in a storage-area network ("SAN") familiar to those skilled in the art. Similarly, any necessary files for performing the functions attributed to the computers 705, 710, 715, 725, 730 may be stored locally on the respective computer and/or remotely, as appropriate. In one set of embodiments, the database 735 may be a relational database, such as Oracle 10i™, that is adapted to store, update, and retrieve data in response to SQL-formatted commands. Database 735 may be the same or similar to the database used herein.

FIG. 8 illustrates one embodiment of a computer system 800 upon which servers or other systems described herein may be deployed or executed. The computer system 800 is shown comprising hardware elements that may be electrically coupled via a bus 855. The hardware elements may include one or more central processing units (CPUs) 805; one or more input devices 810 (e.g., a mouse, a keyboard, etc.); and one or more output devices 815 (e.g., a display device, a printer, etc.). The computer system 800 may also include one or more storage device 820. By way of example, storage device(s) 820 may be disk drives, optical storage devices, solid-state storage device such as a random access memory ("RAM") and/or a read-only memory ("ROM"), which can be programmable, flash-updateable and/or the like.

The computer system 800 may additionally include a computer-readable storage media reader 825; a communications system 830 (e.g., a modem, a network card (wireless or wired), an infra-red communication device, etc.); and working memory 840, which may include RAM and ROM devices as described above. In some embodiments, the computer system 800 may also include a processing acceleration unit 835, which can include a DSP, a special-purpose processor and/or the like.

The computer-readable storage media reader 825 can further be connected to a computer-readable storage medium, together (and, optionally, in combination with storage device (s) 820) comprehensively representing remote, local, fixed, and/or removable storage devices plus storage media for temporarily and/or more permanently containing computer-readable information. The communications system 830 may permit data to be exchanged with the network 820 and/or any other computer described above with respect to the system 800. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 800 may also comprise software elements, shown as being currently located within a working memory 840, including an operating system 845 and/or other code 850, such as program code implementing the servers or devices described herein. It should be appreciated that alternate embodiments of a computer system 800 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other types of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the embodiments have been described in detail herein, it is to be understood that the inventive concepts may be otherwise variously embodied and employed, and that the appended claims are intended to be construed to include such variations, except as limited by the prior art.

What is claimed is:

1. A computer program product including computer executable instructions stored onto a non-transitory computer readable medium which, when executed by a processor of a computer, causes the computer to perform a method for conducting an Instant Messaging (IM) session, the instructions comprising:
   instructions to receive a first IM message from a first IM client at a Session Initiation Protocol (SIP) instant messaging server, wherein the received first IM message is destined for a second IM client;
   instructions to establish, via the SIP instant messaging server, a Session Initiation Protocol (SIP) session between the first IM client and the second IM client;
   instructions to generate automatically, at the SIP instant messaging server, a conversation identifier (ID) in response to determining that the conversation ID was not included in the received first IM message;
   if the conversation ID was not included in the received first IM message:
      instructions to create a new data structure in an archive for the received first IM message; and
      instructions to store the received first IM message with the conversation ID in the new data structure;
   instructions to send, by the SIP instant messaging server, the received first IM message with the conversation ID to the second IM client;
   instructions to receive a third IM message from a third IM client, wherein the third IM client is associated with a first user, wherein the first user is associated with the first IM client, and wherein the third IM message includes the conversation ID;
   instructions to retrieve at least a second IM message from the archive, wherein the second IM message is associated with the conversation ID;
   instructions to provide at least the second IM message to the second IM client; and
   instructions to provide at least the second IM message to the third IM client.

2. The computer program product as defined in claim 1, wherein the first IM client can also automatically generate the conversation ID, the conversation ID is new, and the conversation ID is not found in the archive.

3. The computer program product as defined in claim 1, wherein the received first IM message is also sent to the third IM client in a multiuser chat session.

4. The computer program product as defined in claim 1, wherein the conversation ID indicates that the received first IM message and a least one other IM message, with the conversation ID, are related to a same logical conversation.

5. The computer program product as defined in claim 1, wherein the conversation ID in the second IM message is based on a user selection of the conversation ID from a user interface.

6. The computer program product as defined in claim 1, further comprising instructions to provide a privacy setting that dictates which of the IM messages will be provided to an added recipient.

7. The computer program product as defined in claim 1, further comprising instructions to provide a web service that receives a privacy or security setting for the received first IM message.

8. A method for conducting an instant messaging (IM) session across two or more Session Initiation Protocol (SIP) sessions, comprising:
- receiving, by a SIP instant messaging server, a first IM message from a first IM client, wherein the received first IM message is destined for a second IM client;
- the SIP instant messaging server establishing a first SIP session between the first IM client and the second IM client;
- the SIP instant messaging server automatically generating a conversation identifier (ID) in response to the SIP instant messaging server determining that the received first IM message did not include the conversation ID;
- the SIP instant messaging server associating the conversation ID with the IM session;
- the SIP instant messaging server sending the received first IM message and the conversation ID to the second IM client;
- the SIP instant messaging server storing the received first IM message with the conversation ID in an archive;
- the SIP instant messaging server ending the first SIP session;
- after the first SIP session is ended, the SIP instant messaging server receiving a second IM message from either the first IM client or the second IM client, wherein the second IM message includes the conversation ID and wherein the conversation ID in the second IM message is retrieved from a previous message containing the conversation ID or based on a user selection of the conversation ID;
- the SIP instant messaging server retrieving the conversation ID from the second IM message;
- based on information stored in the archive associated with the conversation ID, the SIP instant messaging server establishing a second SIP session between the first IM client and the second IM client;
- the SIP instant messaging server sending the second IM message;
- defining a new topic for the SIP session between the first IM client and the second IM client;
- in response to defining the new topic for the SIP session between the first IM client and the second IM client, creating a second conversation ID based on the new topic for the SIP session between the first IM client and the second IM client; and
- associating any new IM messages in the SIP session between the first IM client and the second IM client with the second conversation ID.

9. The method as defined in claim 8, further comprising:
- after receiving the second IM message, the SIP instant messaging server retrieving at least the received first IM message from the archive based on the conversation ID; and
- the SIP instant messaging server providing at least the received first IM message to at least one of the first IM client or the second IM client as a previous messages thread.

10. The method as defined in claim 9, wherein the previous message thread is displayed with the second IM message to appear as an uninterrupted IM conversation.

11. The method as defined in claim 10, further comprising the SIP instant messaging server sending the received first IM message to a third IM client in a multiuser chat.

12. The method as defined in claim 11, further comprising:
- the SIP instant messaging server receiving a third IM message addressed to a fourth IM client and having the conversation ID, wherein the fourth IM client was not addressed in the first or second IM message and wherein the conversation ID in the third message is retrieved from a previous message containing the conversation ID or based on a user selection of the conversation ID;
- after receiving the third IM message, the SIP instant messaging server retrieving at least the received first IM message and the second IM message from the archive based on the conversation ID; and
- the SIP instant messaging server providing at least the received first IM message and the second IM message to the fourth IM client as a previous messages thread.

13. The method as defined in claim 8, wherein the conversation ID in the second IM message is based on a user selection of the conversation ID from a user interface.

14. The method as defined in claim 8, further comprising a privacy setting that dictates which of the IM messages will be provided to an added recipient.

15. A Session Initiation Protocol (SIP) instant messaging server comprising:
- an archive that stores one or more instant messages;
- a memory that stores computer-executable instructions;
- a processor in communication with the memory, the processor executes the computer-executable instructions to execute:
- a message relay that:
  - receives a first IM message from a first IM client, wherein the received first IM message is destined for a second IM client;
  - generates a conversation identifier (ID) in response to determining that the received first IM message did not include the conversation ID;
  - establishes a SIP session between the first IM client and the second IM client;
  - sends the received first IM message with the conversation ID; and
  - receives a second IM message from a third IM client, wherein the third IM client is associated with a first user, wherein the first user is also associated with the first IM client, and wherein the second IM message includes the conversation ID;
- an archiving engine that:
  - obtains the conversation ID;
  - associates the conversation ID with the IM session; and
  - stores the received first IM message with the conversation ID in the archive; and an archive interface that:
  - retrieves at least the received first IM message from the archive, wherein the received first IM message is associated with the conversation ID; and
  - provides at least the received first IM message to the second IM client.

16. The SIP instant messaging server as defined in claim 15, wherein the archiving engine further:
- creates a new data structure in the archive for the received first IM message;
- generates automatically a new conversation ID; and
- stores the new conversation ID with the received first IM message in the new data structure.

17. The SIP instant messaging server as defined in claim 16, wherein the data structure includes at least one of the conversation ID, a sender ID, a receiver ID, a time stamp, privacy and security settings, and a message text, wherein the privacy and security settings limit how the instant message is shared with a user.

18. The SIP instant messaging server as defined in claim 17, wherein the archive includes two or more data structures, and wherein at least two of the data structures share a same conversation ID.

19. The SIP instant messaging server as defined in claim 15, further comprising a web service that receives a privacy or security setting for the received first IM message.

20. The SIP instant messaging server as defined in claim 15, wherein the received first IM message is also sent to the third IM client in a multiuser chat session.

* * * * *